(12) United States Patent
Zou (10) Patent No.: US 8,824,110 B2
(45) Date of Patent: Sep. 2, 2014

(54) POWER PLUG WITH LEAKAGE CURRENT PROTECTION

(71) Applicant: Zhongshan Kaper Electrical Co., Ltd., Zhongshan (CN)

(72) Inventor: Bill Zou, Zhongshan (CN)

(73) Assignee: Zhongshan Kaper Electrical Co., Ltd, Zhongshan (CN)

( * ) Notice: Subject to any disclaimer, the term of this patent is extended or adjusted under 35 U.S.C. 154(b) by 105 days.

(21) Appl. No.: 13/716,069

(22) Filed: Dec. 14, 2012

(65) Prior Publication Data
US 2013/0100560 A1  Apr. 25, 2013

Related U.S. Application Data

(63) Continuation-in-part of application No. PCT/CN2011/000589, filed on Apr. 6, 2011.

(51) Int. Cl.
| | |
|---|---|
| *H02H 9/08* | (2006.01) |
| *H02H 3/06* | (2006.01) |
| *H01R 13/713* | (2006.01) |
| *H01R 24/30* | (2011.01) |
| *H01H 83/04* | (2006.01) |

(52) U.S. Cl.
CPC ............. *H02H 3/06* (2013.01); *H01R 13/7135* (2013.01); *H01R 24/30* (2013.01); *H01H 83/04* (2013.01)
USPC .......................................................... 361/42

(58) Field of Classification Search
CPC ........................................................ H02H 3/16
USPC ............................................................ 361/42
See application file for complete search history.

(56) References Cited

U.S. PATENT DOCUMENTS

| | | | |
|---|---|---|---|
| 8,390,404 B2 * | 3/2013 | Zou ................................... | 335/6 |
| 2002/0003686 A1 * | 1/2002 | Disalvo ........................... | 361/42 |

* cited by examiner

*Primary Examiner* — Rexford Barnie
*Assistant Examiner* — Tien Mai
(74) *Attorney, Agent, or Firm* — Matthias Scholl P.C.; Matthias Scholl (57) ABSTRACT

A power plug, including: a shell, the shell having two sides, a reset button and a test button protruding from the first side, and a live wire pin and a neutral wire pin protruding from the second side; a circuit board; a stationary contact; a movable contact; a tripping device; a cross arm; and a push block. The stationary contact is connected with the live wire pin and the neutral wire pin; the movable contact can be connected to or disconnected from the stationary contact. The tripping device includes a sliding pedestal and a sliding part and controls the connection between the movable contact and the stationary contact. An elastic member is disposed on the push block. An ejector spring is disposed on one end of the movable armature. A reset spring is disposed between the sliding part and the sliding pedestal.

6 Claims, 12 Drawing Sheets

POWER PLUG WITH LEAKAGE CURRENT PROTECTION

CROSS-REFERENCE TO RELATED APPLICATIONS

This application is a continuation-in-part of International Patent Application No. PCT/CN2011/000589 with an international filing date of Apr. 6, 2011, designating the United States, now pending, and further claims priority benefits to Chinese Patent Application No. 201010586588.5 filed Dec. 5, 2010. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 14781 Memorial Drive, Suite 1319, Houston, Tex. 77079.

BACKGROUND OF THE INVENTION

1. Field of the Invention

The invention relates to a power plug, and more particularly to a power plug with leakage current protection.

2. Description of the Related Art

Currently, household appliances are connected to the commercial power via power plugs. A typical plug on the market includes a shell, two or three pins protruding from the shell, and a power cable connected with the pins. During the production of an electric appliance, the power cable of the plug is connected with a power contact of the inner circuit board of the electric appliance to form an electric connection. In use, the connection between the household appliance and the commercial power is realized once the pins of the plug are inserted into the power socket. However, the plug has no leakage protection structure, once leakage faults between the live wire, neutral wire, and ground wire of the output end of the pins, or short circuit between the live wire and the neutral wire occurs, they may directly result in personal injury or damage to household appliances.

SUMMARY OF THE INVENTION

In view of the above-described problems, it is one objective of the invention to provide a power plug that has leakage protection capability, simple structure, reasonable design, and is easily produced in batches, also, the plug can real-time detect leakage faults of the power cable, and disconnect the load from the power in time.

To achieve the above objective, in accordance with one embodiment of the invention, there is provided a power plug, comprising: a shell, the shell comprising a first side and a second side, a reset button and a test button protruding from the first side, and a live wire pin and a neutral wire pin protruding from the second side; a circuit board; a stationary contact; a movable contact; a tripping device; a cross arm; a push block; and a tripping coil. The circuit board, the stationary contact, the movable contact, the tripping device, the cross arm, and the push block are arranged inside the shell. The circuit board is in electric connection with the live wire pin and the neutral wire pin, and comprises a leakage protection circuit for detecting leakage faults of a power output cable. The stationary contact is connected with the live wire pin and the neutral wire pin; the movable contact can be connected to or disconnected from the stationary contact, and is connected with a power output cord. The tripping device controls a connection or disconnection between the movable contact and the stationary contact. The tripping device comprises: a sliding pedestal fixed inside the shell, and a sliding part capable of being pressed down by the reset button to move downward or upward on the sliding pedestal. The sliding part comprises: a first inclined plane, and a hook. The movable contact is driven by the cross arm, and the cross arm comprises a limiting hole matching with the hook. The push block comprises two ends, one end leans against the cross arm, the other end matches with the first inclined plane and is capable of being pushed by the first inclined plane. An elastic member is disposed on the push block for keeping the push block leaning against the cross arm. A reset spring is disposed between the sliding part and the sliding pedestal. The movable contact is connected with a reset elastic member. The tripping coil is disposed on one side of the cross arm opposite to the push block, in electric connection with the circuit board, and de-energized by the test button. A stationary armature and a movable armature are disposed inside the tripping coil. An ejector spring is disposed on one end of the movable armature opposite to the stationary armature. An elastic force of the reset spring is larger than a sum of an elastic force of the elastic member and an elastic force of the ejector spring. The elastic force of the ejector spring is larger than the elastic force of the elastic member.

In a class of this embodiment, the shell comprises: an upper cover, and a lower cover. The reset button and the test button protrude from an upper surface of the upper cover; and the live wire pin and the neutral wire pin protrude from a lower surface of the lower cover.

In a class of this embodiment, the push block is L-shaped.

In a class of this embodiment, the cross arm comprises a second inclined plane on an upper right. The hook comprises a third inclined plane on a lower left, and the third inclined plane slidably fits with the second inclined plane.

In a class of this embodiment, the elastic member is a torsional spring.

In a class of this embodiment, the reset elastic member is a leaf spring.

Advantages of the invention are summarized as follows:
1. when the leakage faults occur during the use of the electric appliance, and the leakage current achieves to a preset value, the power supply can be cut off, so that the personal safety and the electric appliance are protected;
2. when interruption occurs on the live wire or the neutral wire, the plug can cut off the power supply in case of the personal injury by electric shock; and
3. the plug of the invention has a simple structure, reasonable design, and is easy for production in batches.

DETAILED DESCRIPTION OF THE EMBODIMENTS

Figure 1:
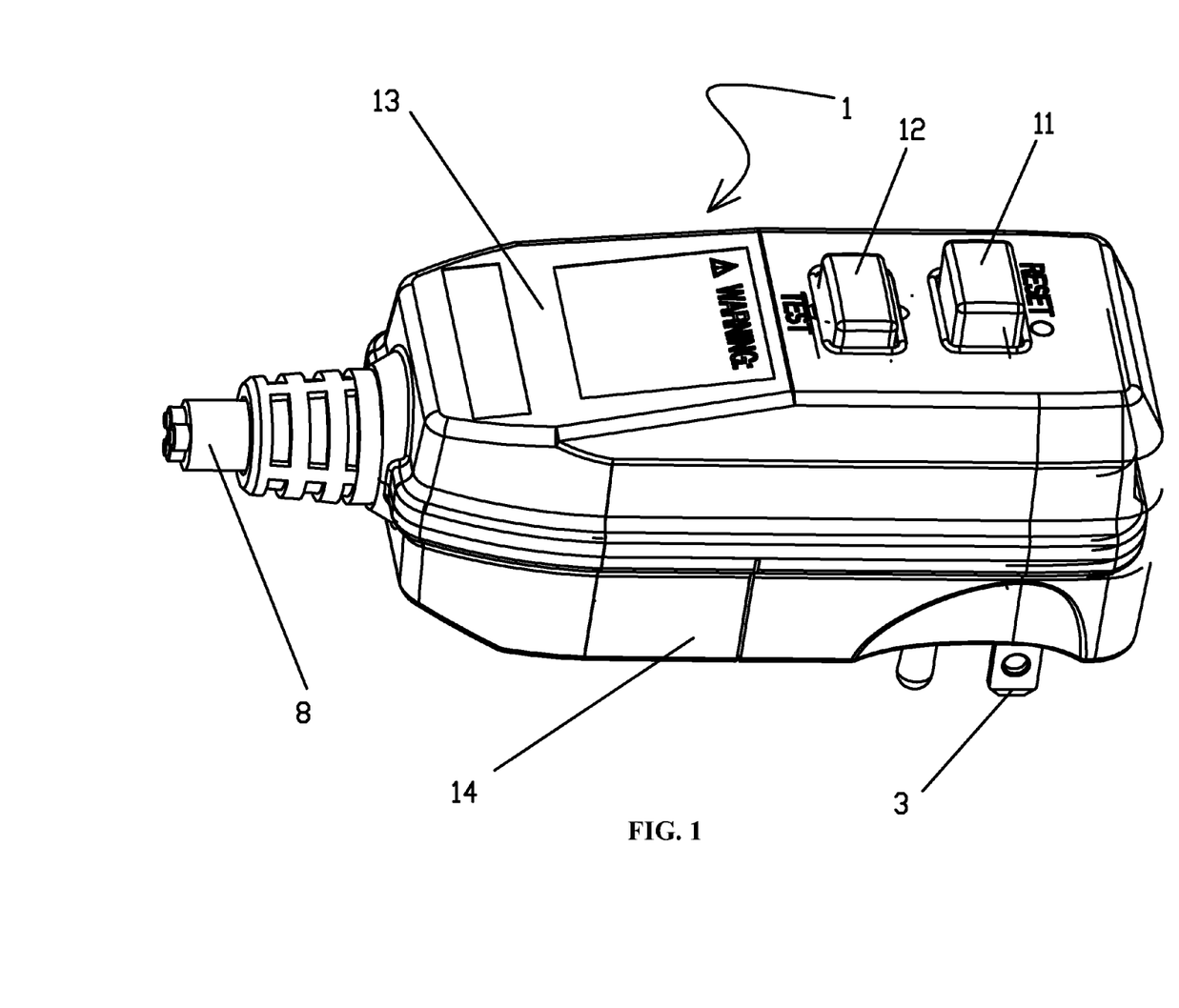
FIG. 1 is a stereogram of a power plug in accordance with one embodiment of the invention.
Figure 2:
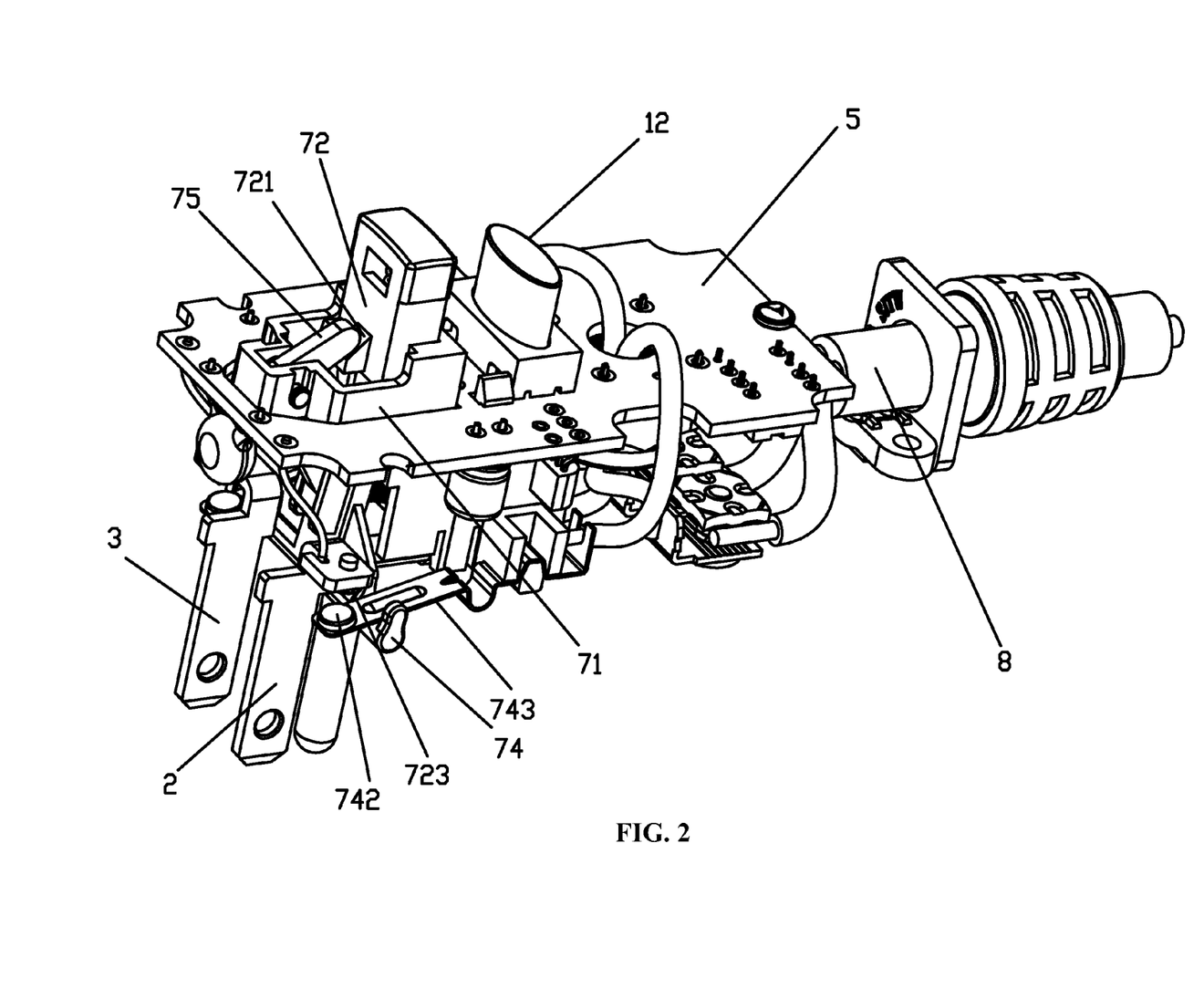
FIG. 2 is a first stereogram of an inner structure of a power plug in accordance with one embodiment of the invention.
Figure 3:
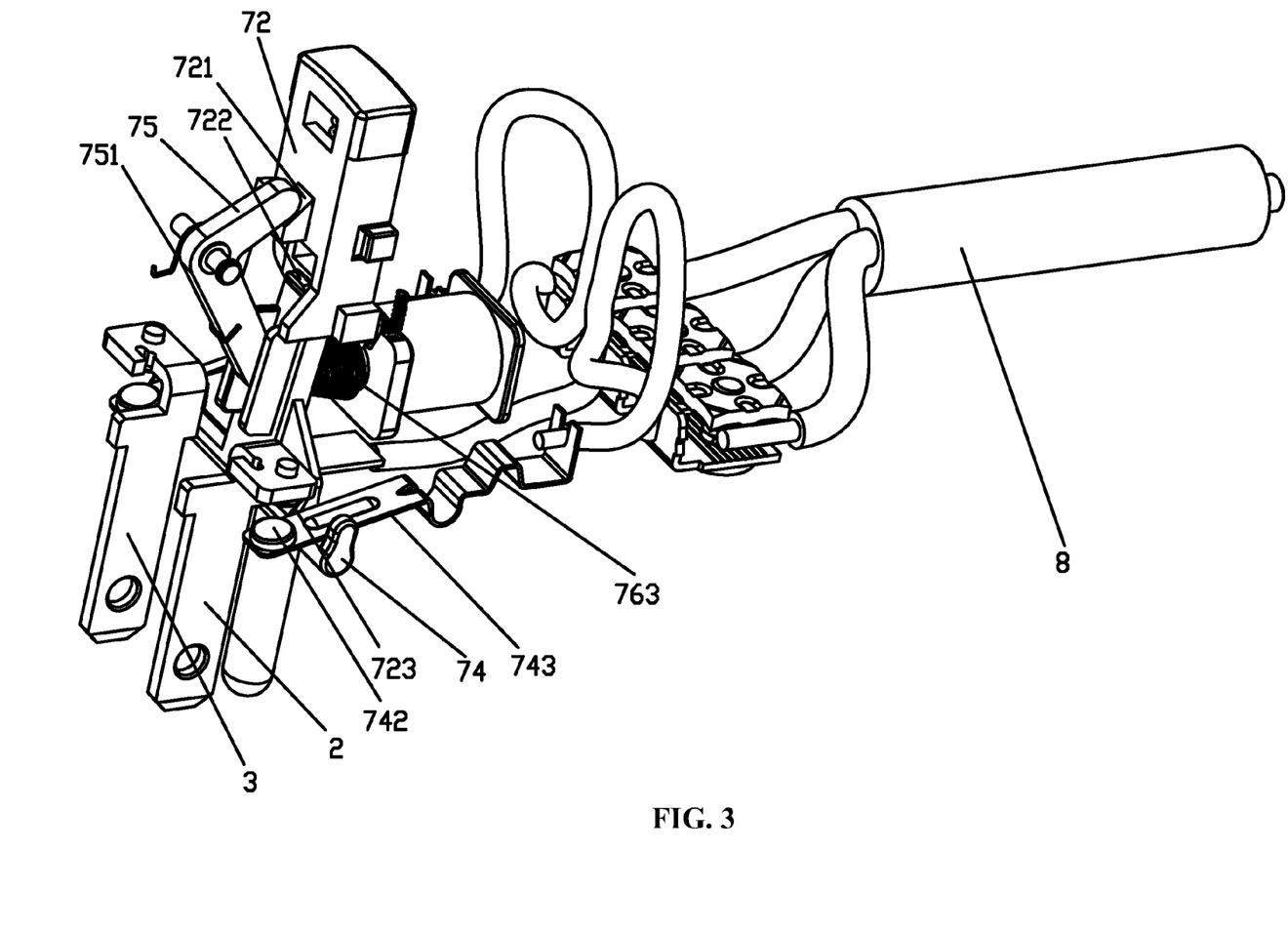
FIG. 3 is a second stereogram of an inner structure of a power plug in accordance with one embodiment of the invention.
Figure 4:
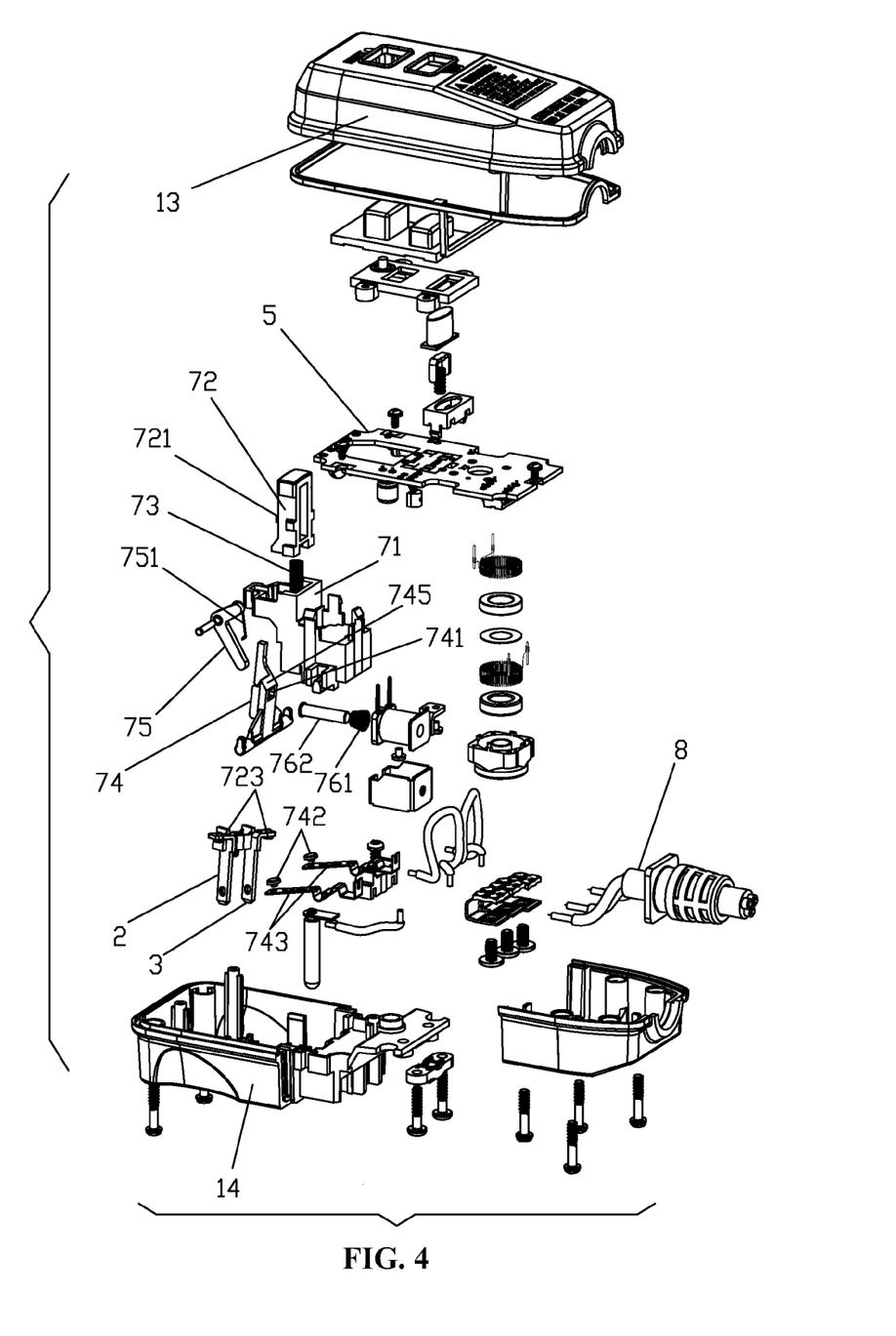
FIG. 4 is an exploded view of a power plug in accordance with one embodiment of the invention.
Figure 5:
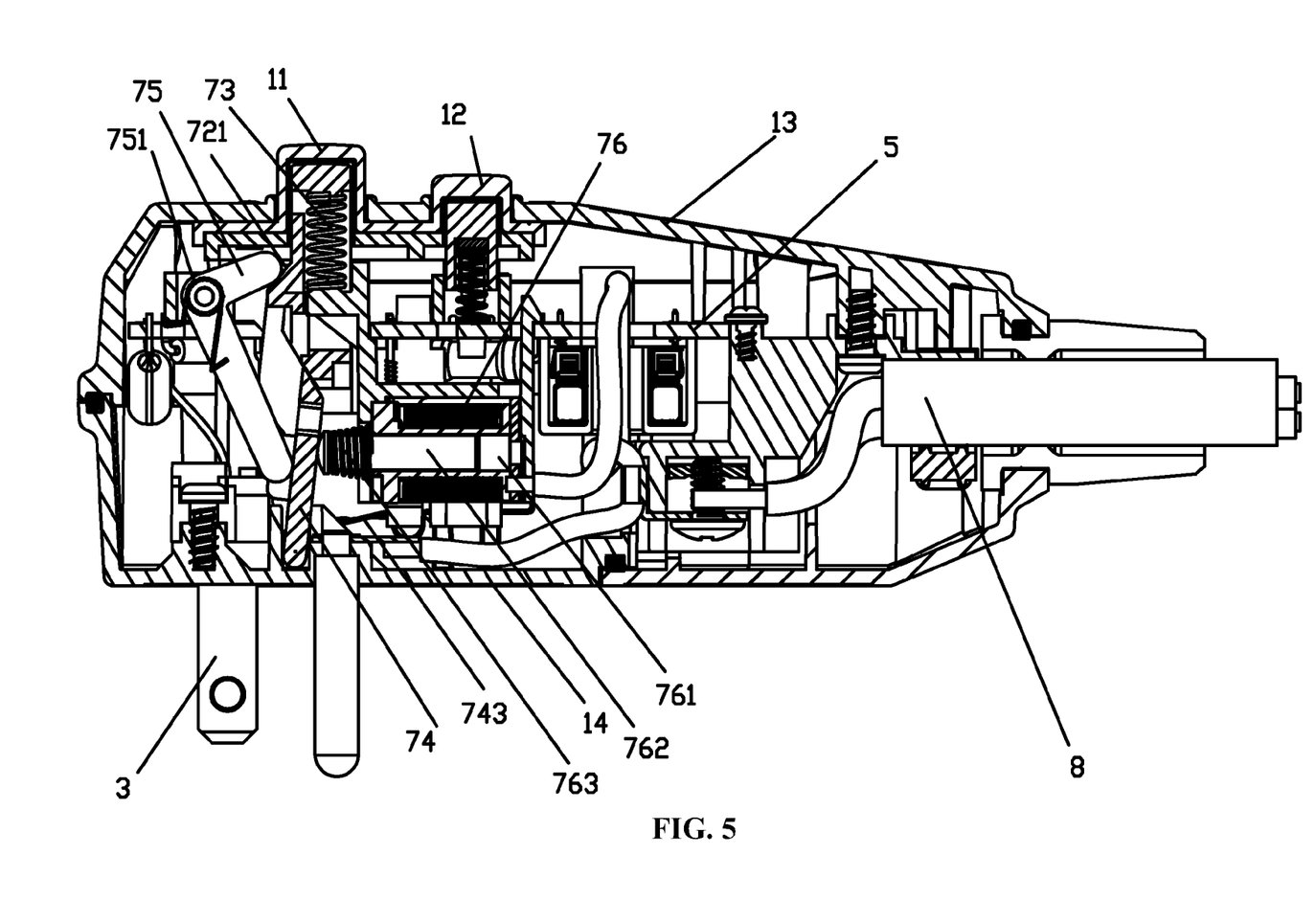
FIG. 5 is a cross-sectional view of a power plug when a tripping coil is energized, a reset button is not pressed down, and a stationary contact is disconnected from a movable contact.
Figure 6:
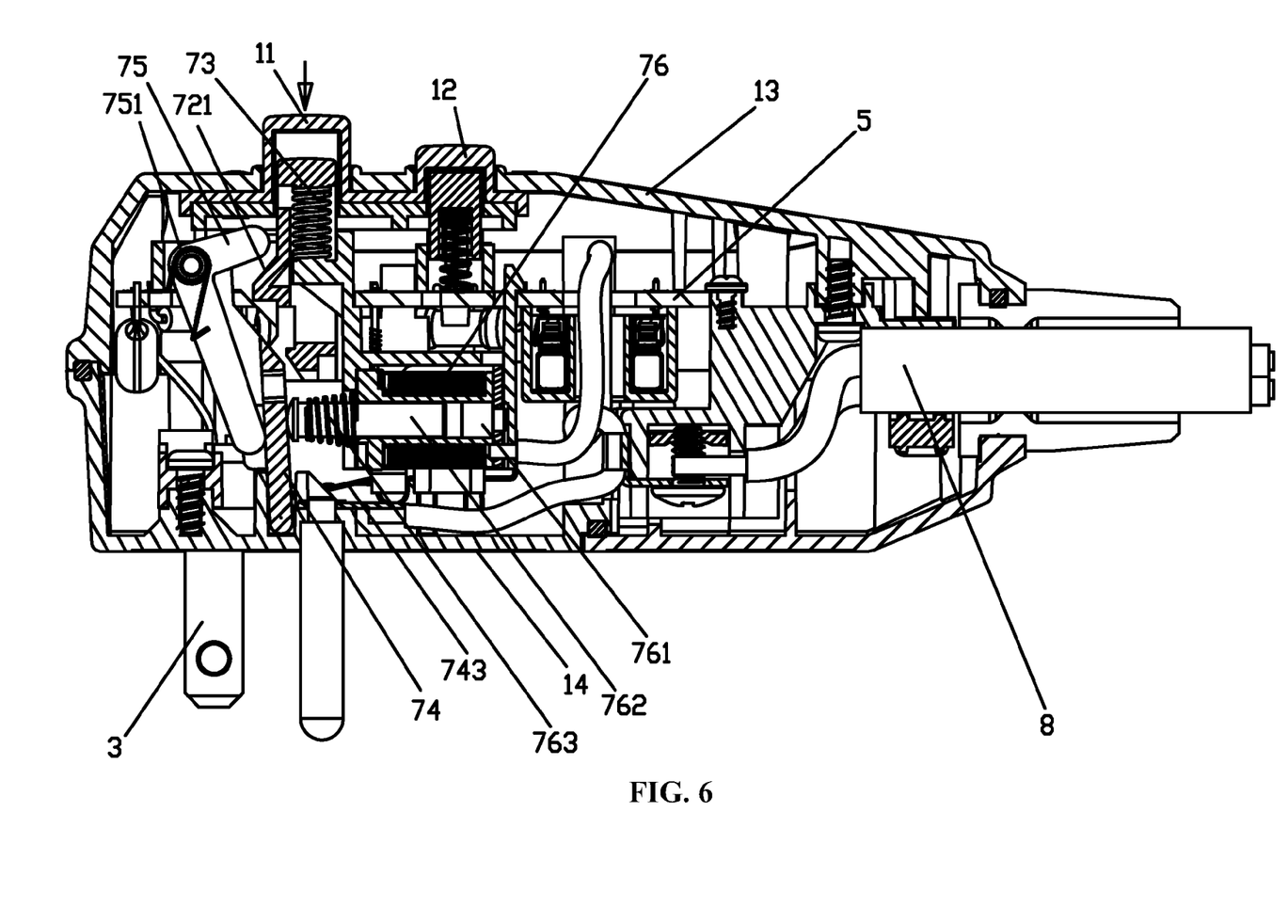
FIG. 6 is a cross-sectional view of a power plug when a tripping coli is not energized, and a reset button is pressed down.
Figure 7:
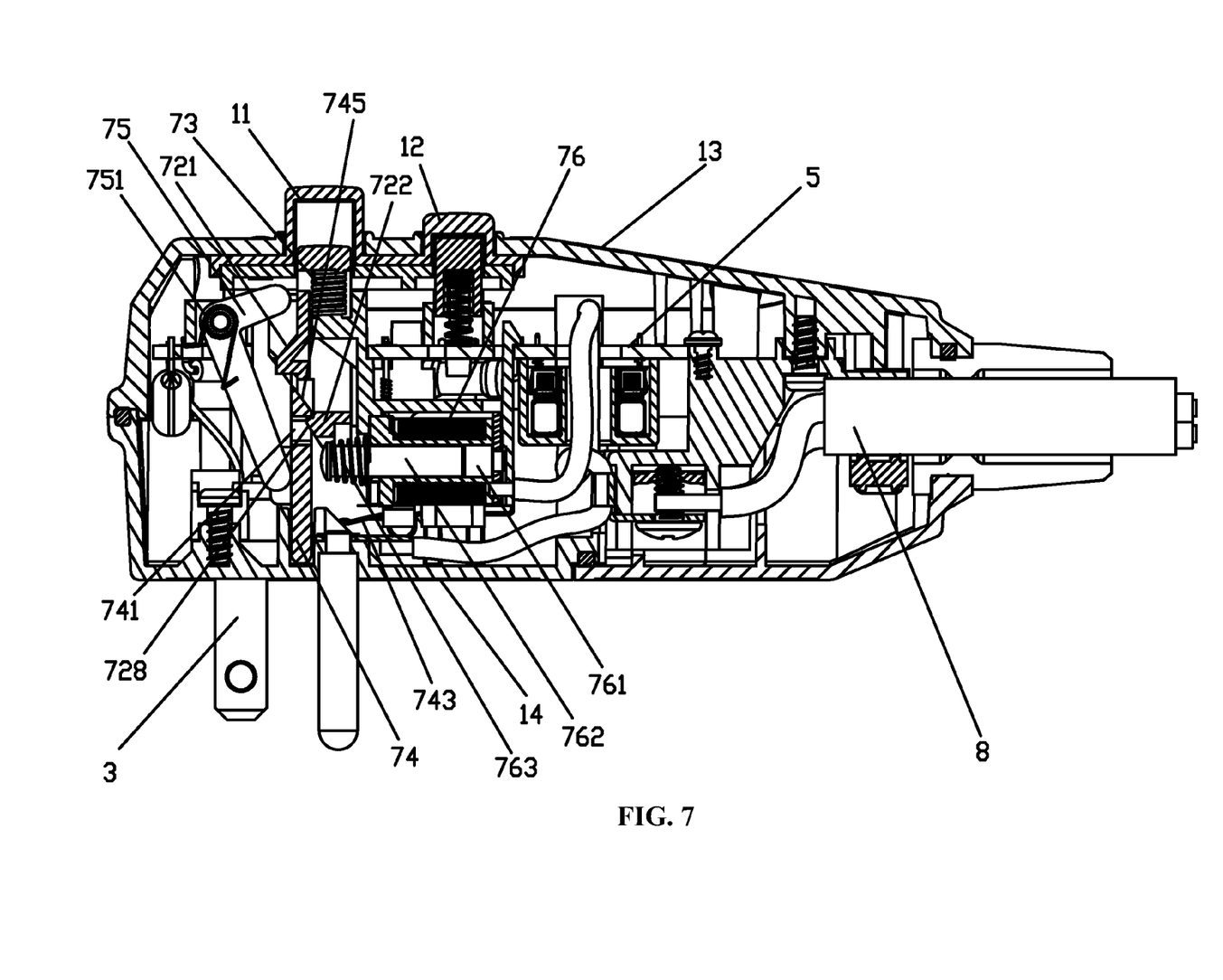
FIG. 7 is a cross-sectional view of a power plug when a tripping coil is energized, and a hook is limited by a limiting hole.
Figure 8:
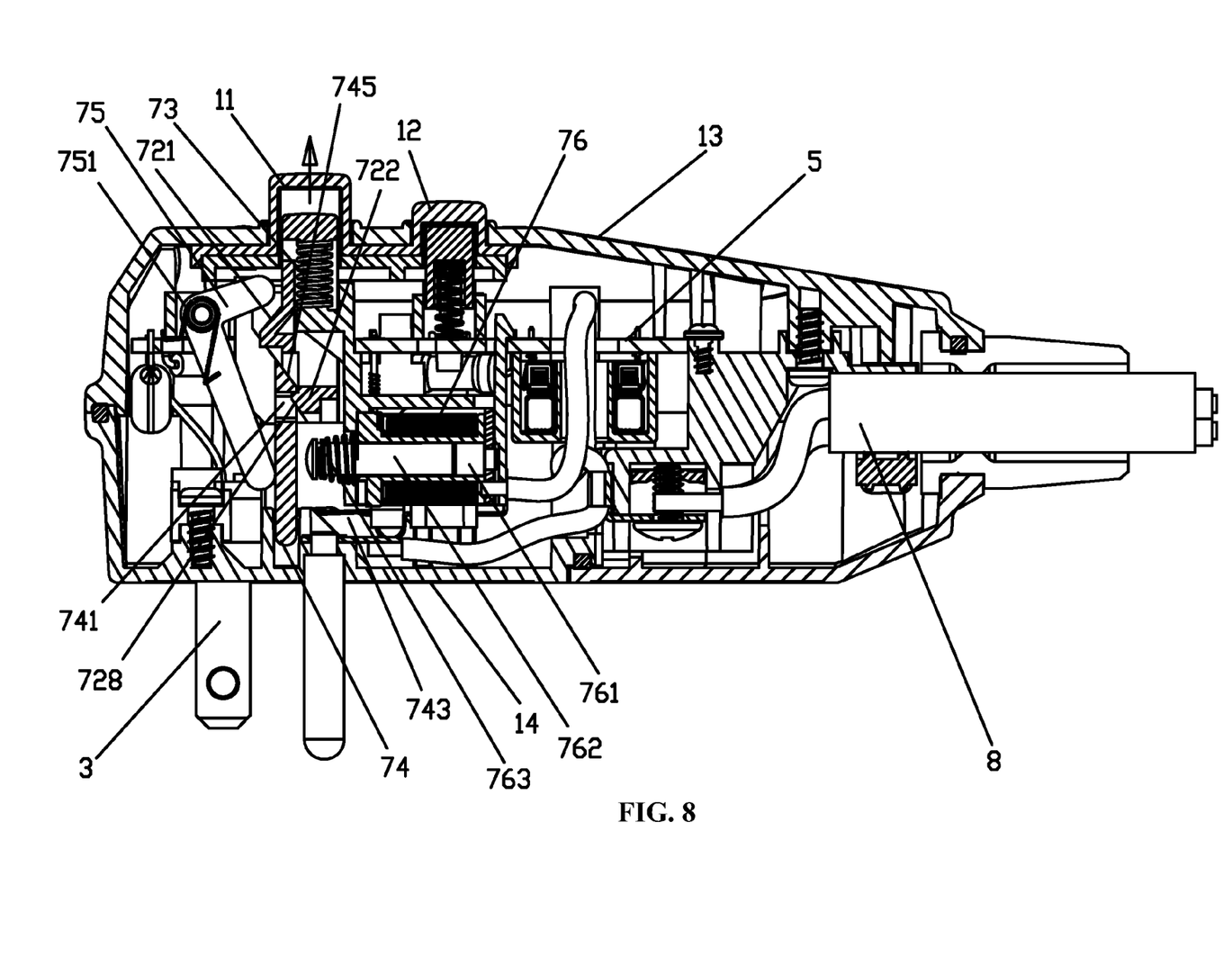
FIG. 8 is cross-sectional view of a power plug when a tripping coil is energized, a reset button is rebounding, and the plug is connected to a power supply.
Figure 9:
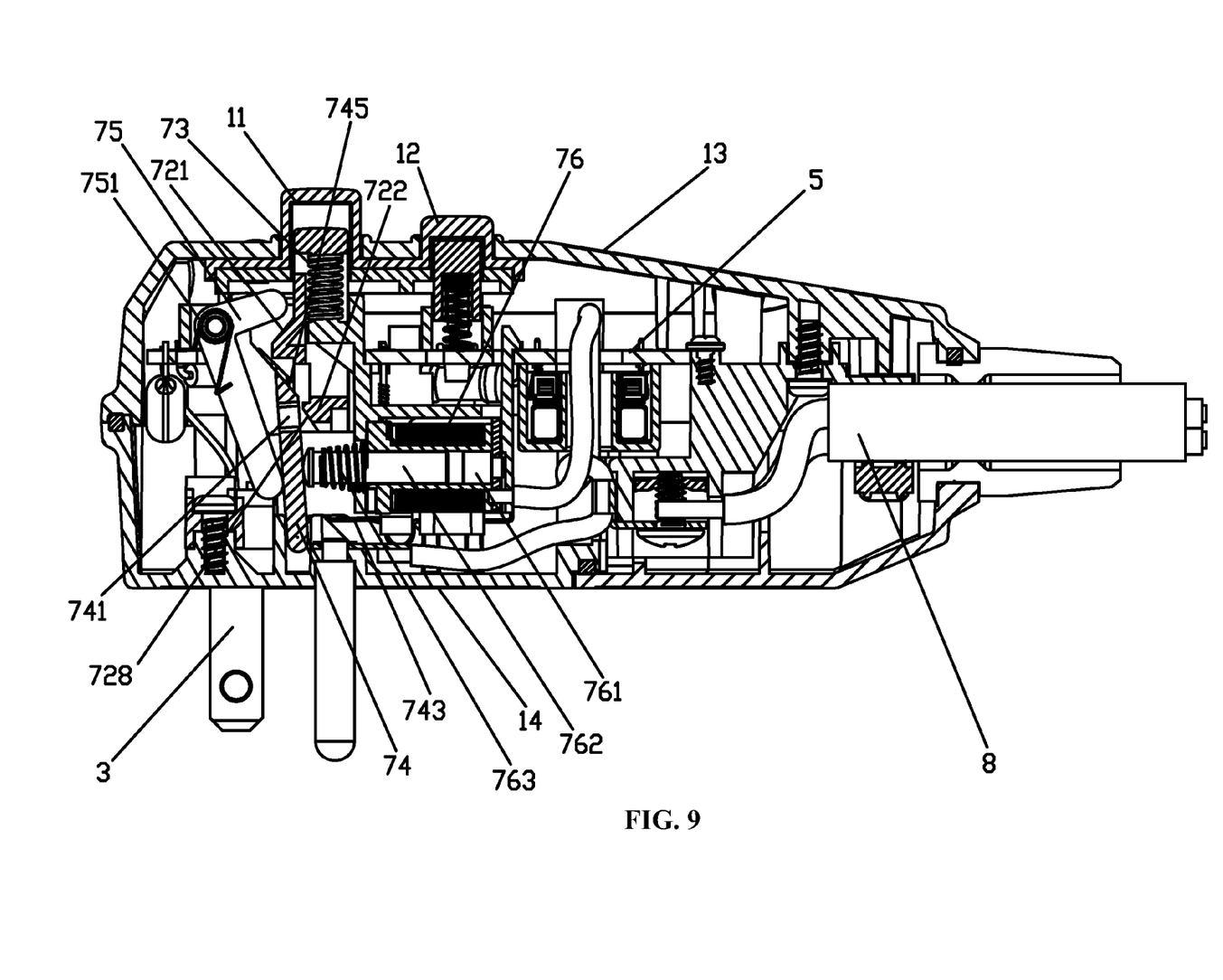
FIG. 9 is cross-sectional view of a power plug in the moment leakage faults occur on an end of a load, a tripping coil is de-energized, the plug is disconnected to a power supply.
Figure 10:
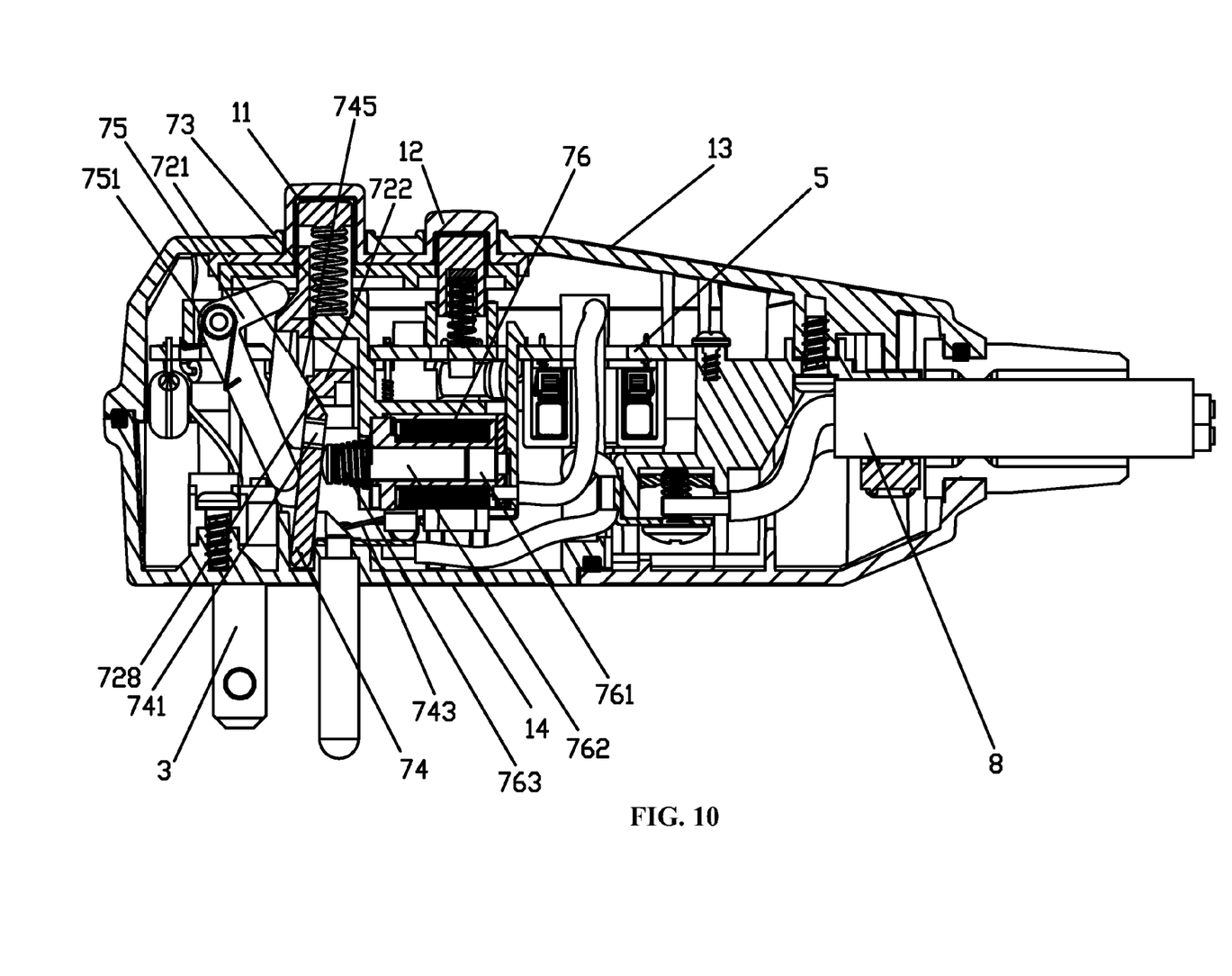
FIG. 10 is cross-sectional view of a power plug after leakage faults occur, and the power is disconnected from a power supply.
Figure 11:
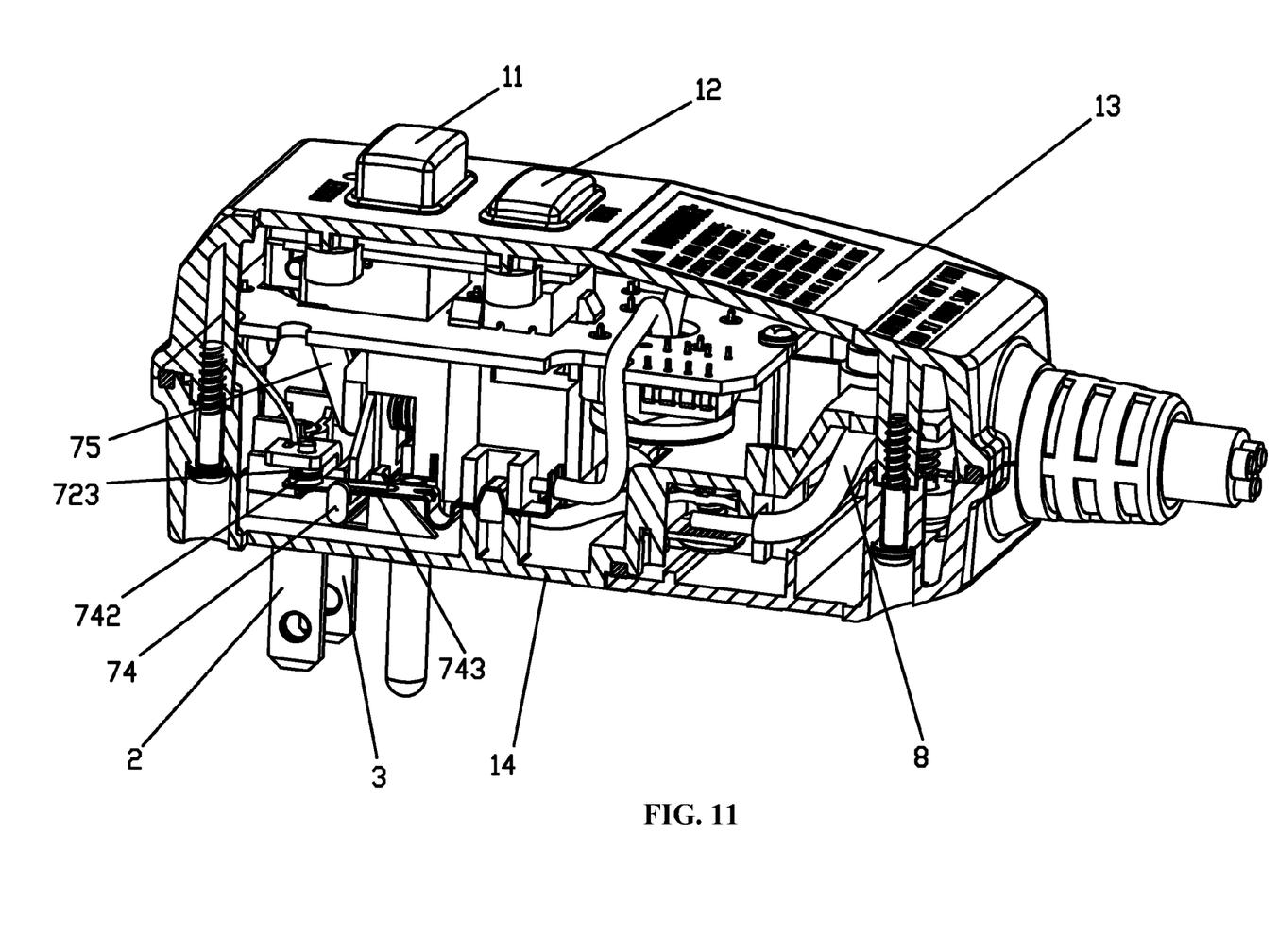
FIG. 11 is cross-sectional view of a power plug in a state when a movable contact is in connection with a stationary contact.
Figure 12:
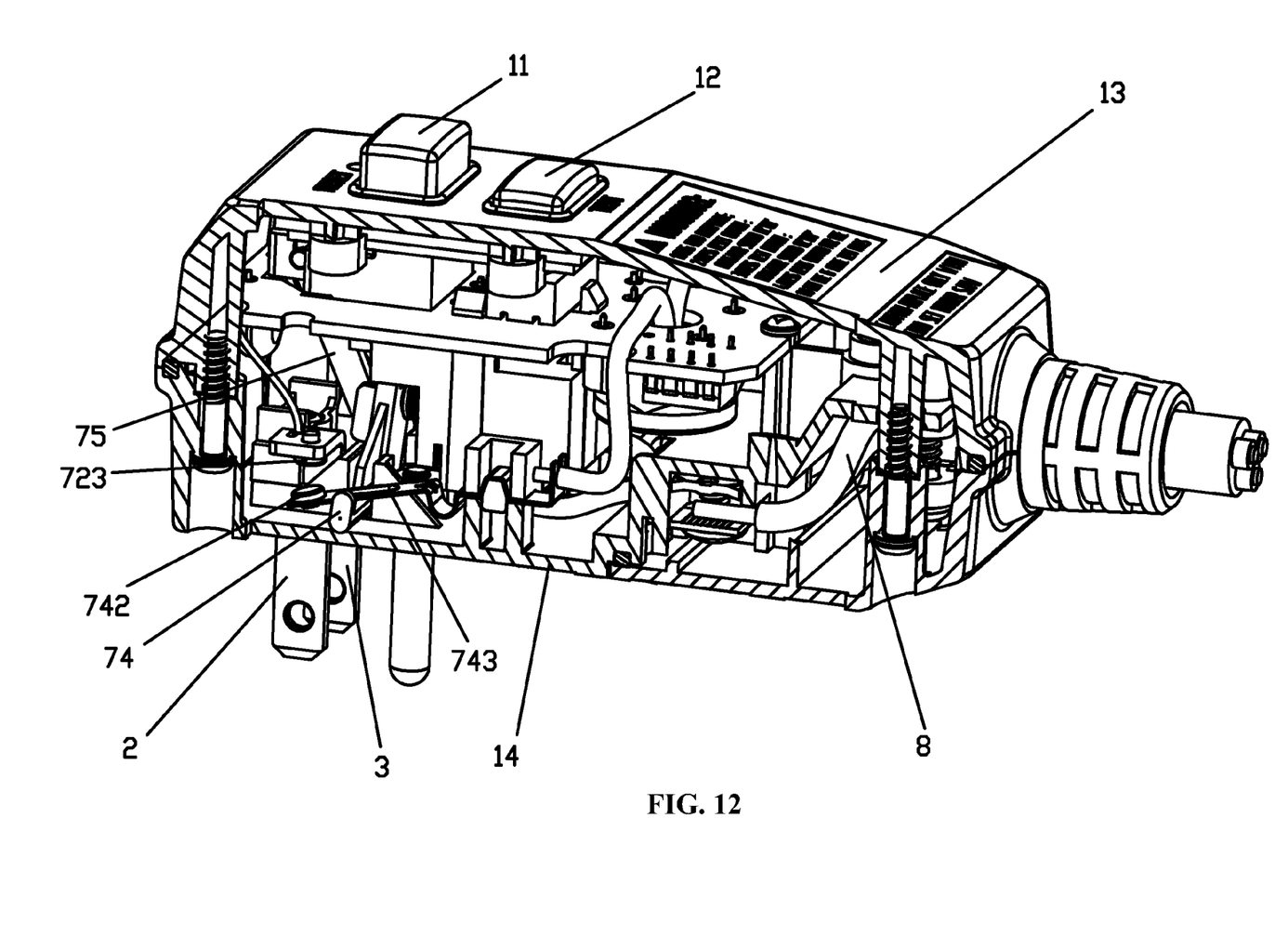
FIG. 12 is cross-sectional view of a power plug in a state when a movable contact is in disconnection with a stationary contact.

To further illustrate the invention, experiments detailing a power plug are described below. It should be noted that the following examples are intended to describe and not to limit the invention.

A power plug having a leakage protection comprises a shell 1 comprising a first side and a second side. A reset button 11 and a test button 12 protrude from the first side of the shell 1; and a live wire pin 3 and a neutral wire 2 pin protrude from the second side of the shell 1. A circuit board 5 is arranged inside the shell 1 and in electric connection with the live wire pin 3 and the neutral wire pin 2. The circuit board 5 comprises a leakage protection circuit for detecting leakage faults of a power output cable. A stationary contact 5 is arranged inside the shell 1. The stationary contact 723 is connected with the live wire pin 3 and the neutral wire pin 2. The movable contact 742 can be connected to or disconnected from the stationary contact 723, and is connected with a power output cord 8. A tripping device is arranged inside the shell 1. The connection or disconnection between the movable contact 742 and the stationary contact 723 is under control of the tripping device. The tripping device comprises: a sliding pedestal 71 fixed inside the shell 1, and a sliding part 72 which is downward or upward movable on the sliding pedestal 71 and can be pressed down by the reset button 11. The sliding part 72 comprises: a first inclined plane 721, and a hook 722. A cross arm 74 is arranged inside the shell 1 and drives the movable contact 742. The cross arm 74 comprises a limiting hole 741 matching with the hook 722. A push block 75 is arranged inside the shell 1. The push block 75 comprises two ends, one end leans against the cross arm 74, the other end matches with the first inclined plane 721 and is capable of being pushed by the first inclined plane 721. An elastic member 751 is disposed on the push block 75 for keeping the push block 75 leaning against the cross arm 74. A reset spring 73 is disposed between the sliding part 72 and the sliding pedestal 71. The movable contact 742 is connected with a reset elastic member 743. A tripping coil 76 is disposed on one side of the cross arm 74 opposite to the push block 75, the tripping coil 76 is in electric connection with the circuit board 5 and is de-energized by the test button 12. A stationary armature 761 and a movable armature 762 are disposed inside the tripping coil 76. An ejector spring 763 is disposed on one end of the movable armature 762 opposite to the stationary armature 761. An elastic force of the reset spring 73 is larger than a sum of an elastic force of the elastic member 751 and an elastic force of the ejector spring 763; the elastic force of the ejector spring 763 is larger than the elastic force of the elastic member 751.

The shell 1 comprises: an upper cover 13 and a lower cover 14. The reset button 11 and the test button 12 protrude from an upper surface of the upper cover 13; the live wire pin 3 and the neutral wire pin 2 protrude from a lower surface of the lower cover 14.

The push block 75 is L-shaped.

The cross arm 74 comprises a second inclined plane 745 on an upper right part; the hook 722 comprises a third inclined plane 728 on a lower left part, and the third inclined plane 728 slidably fits with the second inclined plane 745.

The elastic member 751 is a torsional spring; and the reset elastic member 743 is a leaf spring.

When using a household appliance, the plug is inserted into a power socket. At the moment, the movable contact 742 is disconnected from the stationary contact 723. In order to connect the household appliance to the commercial power, an external force is applied to press down the reset button 11, which drives the sliding part 72 to move downwards and meanwhile press down the reset spring 73, until the hook 722 is aligned with the limiting hole 741. In such a condition, if the power socket is powered and the circuit board 5 is connected to the live wire pin 3 and the neutral wire pin 2, the tripping coil 76 can be energized, so that the stationary armature 761 becomes magnetic and attracts the movable armature 762 which in turn compresses the ejector spring 763. The lower end of the push block 75 pushes the cross arm 74 to move transversely until the hook 741 is limited by the limiting hole 722. After the external force is released, driven by the elastic force of the reset spring 73, the sliding part 72 moves upwards, at the same time the cross arm 74 moves upwards due to the connection between the hook 722 and the limiting hole 741. The first inclined plane 721 pushes the upper end of the push block 75 towards an upper left, so that the lower end of the push block 75 presses the cross arm 74, and the limiting hole 741 fastens the hook 722. Driven by the cross arm 74, the movable contact 742 moves upwards and contacts with the stationary contact 723. Therefore, the electric connection between the load and the pins is achieved, and the commercial power supplies power to the household appliances via the plug.

Press down the reset button 11, if the power socket has no power input, the tripping coil 76 is not energized and the stationary armature 761 inside loses magnetism, so that the movable armature 762 is released, and pushed out due to the elastic force of the ejector spring 763. The cross arm 74 is pushed transversely by the movable armature 762, which causes the disconnection between the hook 722 and the limiting hole 741. After the external force is withdrawn, the sliding part 72 moves upwards due to the elastic force of the reset spring 73. As the hook 722 is disconnected from the limiting hole 741, the first inclined plane 721 pushes the upper end of the push block 75 towards an upper left, so that the lower end of the push block 75 presses the cross arm 74. As the first inclined plane 745 slidably fits with the second inclined plane 728, the cross arm 74 moves downwards and further presses the movable armature 762. The reset elastic member 743 bounces back, which drives the movable contact 742 to disconnect from the stationary contact. Thus, the load is disconnected from the pins, and the household appliance cannot be energized.

Press down the test button 12, which triggers the test circuit and causes de-energization of the tripping coil 76, the stationary armature 761 loses magnetism, so that the movable armature 762 is released, and is pushed out due to the elastic force of the ejector spring 763. The cross arm 74 is pushed transversely by the movable armature 762, which causes disconnection between the hook 722 and the limiting hole 741. The sliding part 72 moves upwards due to the elastic force of the reset spring 73. As the hook 722 is disconnected from the limiting hole 741, the first inclined plane 721 pushes the upper end of the push block 75 towards an upper left, so that the lower end of the push block 75 presses the cross arm 74. As the first inclined plane 745 slidably fits with the second inclined plane 728, the cross arm 74 moves downwards and further presses the movable armature 762. The reset elastic member 743 bounces back, which drives the movable contact 742 to disconnect from the stationary contact. Thus, the load is disconnected from the pins, and the household appliance cannot be energized.

When the leakage fault occurs during the use of the household appliance, and the leakage current achieves to a preset value, the tripping coil 76 is de-energized and the stationary armature 761 loses magnetism, so that the movable armature 762 is released, and is pushed out due to the elastic force of the ejector spring 763. The cross arm 74 is pushed transversely by the movable armature 762, which causes disconnection between the hook 722 and the limiting hole 741. The sliding part 72 moves upwards due to the elastic force of the reset spring 73. As the hook 722 is disconnected from the limiting hole 741, the first inclined plane 721 pushes the upper end of the push block 75 towards an upper left, so that the lower end of the push block 75 presses the cross arm 74. As the first inclined plane 745 slidably fits with the second inclined plane 728, the cross arm 74 moves downwards and further presses the movable armature 762. The reset elastic member 743 bounces back, which drives the movable contact 742 to disconnect from the stationary contact. Thus, the disconnection between the load and the pins is achieved, the power supply stops supplying power to the appliance in case of personal injuries by electric shock, so that the personal safety is protected.

When interruption occurs on the live wire or the neutral wire, the tripping coil 76 is de-energized and the stationary armature 761 loses magnetism, so that the movable armature 762 is released, and is pushed out due to the elastic force of the ejector spring 763. The cross arm 74 is pushed transversely by the movable armature 762, which causes disconnection between the hook 722 and the limiting hole 741. The sliding part 72 moves upwards due to the elastic force of the reset spring 73. As the hook 722 is disconnected from the limiting hole 741, the first inclined plane 721 pushes the upper end of the push block 75 towards an upper left, so that the lower end of the push block 75 presses the cross arm 74. As the first inclined plane 745 slidably fits with the second inclined plane 728, the cross arm 74 moves downwards and further presses the movable armature 762. The reset elastic member 743 bounces back, which drives the movable contact 742 to disconnect from the stationary contact. Thus, the disconnection between the load and the pins is achieved; the power supply stops supplying power to the appliance, which otherwise results in electric shock when interruption only exists on the neutral wire.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:
1. A power plug, comprising:
a) a shell (1), the shell comprising a first side and a second side, a reset button (11) and a test button (12) protruding from the first side, and a live wire pin (3) and a neutral wire pin (2) protruding from the second side;
b) a circuit board (5), the circuit board (5) comprising a leakage protection circuit;
c) a stationary contact (723);
d) a movable contact (742);
e) a tripping device;
f) a cross arm (74);
g) a push block (75); and
h) a tripping coil (76);
wherein:
the circuit board (5), the stationary contact (723), the movable contact (742), the tripping device, the cross arm (74), and the push block (75) are arranged inside the shell (1);
the circuit board (5) is in electric connection with the live wire pin (3) and the neutral wire pin (2);
the stationary contact (723) is connected with the live wire pin (3) and the neutral wire pin (2); the movable contact (742) is connected with a power output cord (8) and connected to or disconnected from the stationary contact (723);
the tripping device controls a connection or disconnection between the movable contact (742) and the stationary contact (723); the tripping device comprises: a sliding pedestal (71) fixed inside the shell (1), and a sliding part (72) capable of being pressed down by the reset button (11) to move downward or upward on the sliding pedestal (71); the sliding part (72) comprises: a first inclined plane (721), and a hook (722);
the movable contact (742) is driven by the cross arm (74), and the cross arm (74) comprises a limiting hole (741) matching with the hook (722);
the push block (75) comprises two ends, one end leans against the cross arm (74), the other end matches with the first inclined plane (721) and is capable of being pushed by the first inclined plane (721); an elastic member (751) is disposed on the push block (75) for keeping the push block (75) leaning against the cross arm (74);
a reset spring (73) is disposed between the sliding part (72) and the sliding pedestal (71);
the movable contact (742) is connected with a reset elastic member (743);
the tripping coil (76) is disposed on one side of the cross arm (74) opposite to the push block (75), in electric connection with the circuit board (5), and de-energized by the test button (12);
a stationary armature (761) and a movable armature (762) are disposed inside the tripping coil (76); an ejector spring (763) is disposed on one end of the movable armature (762) opposite to the stationary armature (761); and
an elastic force of the reset spring (73) is larger than a sum of an elastic force of the elastic member (751) and an elastic force of the ejector spring (763);
the elastic force of the ejector spring (763) is larger than the elastic force of the elastic member (751).
2. The plug of claim 1, wherein:
the shell (1) comprises: an upper cover (13) and a lower cover (14);
the reset button (11) and the test button (12) protrude from an upper surface of the upper cover (13); and
the live wire pin (3) and the neutral wire pin (2) protrude from a lower surface of the lower cover (14).

3. The plug of claim 1, wherein the push block (75) is L-shaped.

4. The plug of claim 1, wherein the cross arm (74) comprises a second inclined plane (745) on an upper right; and the hook (722) comprises a third inclined plane (728) on a lower left, and the third inclined plane (728) slidably fits with the second inclined plane (745).

5. The plug of claim 1, wherein the elastic member (751) is a torsional spring.

6. The plug of claim 1, wherein the reset elastic member (743) is a leaf spring.

* * * * *